United States Patent Office 3,259,613
Patented July 5, 1966

3,259,613
PROCESS FOR POLYMERIZING UNSATURATED HYDROCARBONS WITH CATALYSTS BASED ON BERYLLIUM ALKYLS
Giulio Natta, Giorgio Mazzanti, and Paolo Longi, Milan, Italy, assignors to Montecatini Società Generale per l'Industria Mineraria e Chimica, Milan, Italy
No Drawing. Filed July 31, 1961, Ser. No. 127,851
Claims priority, application Italy, July 16, 1957, 10,576/57, Patent 586,441; Nov. 12, 1957, 6,291/57, Patent 602,100
6 Claims. (Cl. 260—93.7)

This application is a continuation in part of Serial No. 725,805 filed April 2, 1958, now abandoned.

This invention relates to an improvement in the catalytic polymerization of unsaturated hydrocarbons of the formula $CH_2=CHR$, in which R is a hydrocarbon radical.

It has been disclosed in pending applications and in the literature that unsaturated hydrocarbons of the aforesaid type can be polymerized in contact with catalysts prepared from halides of transition metals of Groups IV to VI of the Mendeleeff Periodic Table and organometallic compounds of metals belonging to the 2nd and 3rd groups of said Table, to polymerizates the macromolecules of which are substantially linear and regularly head-to-tail.

Natta et al. showed that, when the transistion metal halide used as catalyst-forming component is one in which the metal has the maximum valency corresponding to its position in the Periodic Table, for example when it is $TiCl_4$, $VCl_4$ or $ZrCl_4$, the crude polymerizate is a mixture of sterically differentiated macromolecules which exhibits crystallinity that is associated with only some of the macromolecules comprised in the polymerizate.

From said crude polymerizates, Natta et al. separated the sterically differentiated macromolecules by fractional dissolution on the basis of their differences in steric structure.

Applying their revolutionary fractionation concept to their crudes, Natta et al. separated three distinct homopolymers the macromolecules of which had different stereoregularities and as follows: (a) an amorphous non-crystallizable homopolymer; (b) a partially crystallizable homopolymer; and (c) a highly crystalline homopolymer. They established that the crystallinity exhibited by their homopolymers (b) and (c) was due to a stereoregular structure in the macromolecules of the type Natta called "isotactic" structure and as illustrated in the Natta et al. Patent No. 2,882,263. They further established that macromolecules of their highly crystalline homopolymers (c) were isotactic macromolecules, as defined in said patent, i.e., macromolecules having isotactic structure for substantially their entire length. In the case of polypropylene, the isotactic macromolecules were characterized by being non-extractable with boiling n-heptane.

Subsequently, Natta et al. disclosed that the polymerization of the unsaturated hydrocarbons could be oriented to the production of crude polymerizates consisting prevailingly (for at least 60%) of isotactic macromolecules by polymerizing the monomer in contact with a catalyst the starting components of which are a low valency crystalline transition metal halide, such as violet $TiCl_3$, and selected organometallic compounds, including organometallic compounds of beryllium in which the valences of the metal are satisfied by alkyl groups, and alkyl beryllium compounds in which one valency is satisfied by halogen.

The catalysts prepared from the low valency crystalline transition metal halides, such as $TiCl_3$, and an alkyl beryllium compound are very effective for the stereospecific polymerization of the higher alpha-olefins inasmuch as when those catalysts are used, the crude polymerizate is made up almost completely of the highly crystalline isotactic macromolecules.

When propylene is polymerized in contact with the catalyst prepared from diethyl beryllium and crystalline titanium trichloride, the content of isotactic macromolecules non-extractable with boiling n-heptane in the crude polypropylene is 95% or higher.

Crude polybutene-1 obtained by polymerizing butene-1 in contact with said catalyst contains more than 90% of isotactic macromolecules non-extractable with boiling ether.

The proportion of isotactic macromolecules in the crude polymerizates normally obtained when the transition metal halide component of the catalyst is a hydrocarbon-soluble halide in which the metal has a high valency, such as $TiCl_4$, is also increased when the high valency compound is mixed with a beryllium dialkyl or alkyl beryllium halide as the other catalyst-forming component. However, the increase is not as marked as when the low valency crystalline transition metal as such are used as one starting component.

Alkyl beryllium compounds, such as diethyl beryllium, are relatively high in cost. It is desirable to reduce the amount of the alkyl beryllium compound required to form the catalyst so that the process utilizing that catalyst will be competitive with the processes using the two component catalysts prepared from other organometallic compounds, such as, for example, triethyl aluminum.

We have accomplished this desirable objective to an extent by the indirect method of increasing the yield of polymer up to 800–1000 grams per gram of diethyl beryllium mixed with a low valency crystalline transition metal halide, such as $TiCl_3$.

However, polymer yields larger than 800–1000 grams per gram of diethyl beryllium cannot be obtained. The reason is that, when the concentration of diethyl beryllium is reduced below 0.4–0.6 g./liter of the polymerization solvent used, e.g., n-heptane, for the purpose of increasing the polymer yield based on the quantity of the alkyl beryllium compound used, both the activity and the stereospecificity of the catalyst tend to decrease and to become uncontrollable because the alkyl beryllium compounds are partially or completely destroyed by the small amounts of oxygen, moisture or other reactive impurities present in the various reactants and/or in the apparatus used.

It is the primary object of this invention to provide an improved process for polymerizing the unsaturated hydrocarbons by means of the two-component catalysts prepared from alkyl beryllium compounds in which the polymerization with said catalysts is carried out in the presence of an agent which protects the alkyl beryllium compound from the adverse effects of oxygen, moisture, etc. associated with the reactants and/or present in the apparatus.

We find that by including a protective agent for the alkyl beryllium compound in the catalyst, the amount of alkyl beryllium compound required to form the catalyst can be reduced considerably and to the extent that the process using such catalysts is competitive in cost with the processes using other stereospecific catalysts.

We have discovered that various substances function as protective agents for the alkyl beryllium compound used in preparing the catalysts.

Highly reactive metal alkyls are effective protective agents provided the metal alkyl selected is one which is poorly soluble in the reaction medium and which, in combination with the low valency crystalline transition metal halide, does not form an efficient catalyst for the stereospecific polymerization of the unsaturated hydrocarbon.

Sodium alkyls in which the alkyl groups contain from 3 to 12 carbon atoms, and Grignard reagents are examples of metal alkyls which are useful as protective agents.

The protective agent may also be a complex consisting of an electron donor and a metal alkyl of the type which normally combines with the transition metal halide to form an efficient polymerization catalyst but which is prevented from doing so by the electron donor with which it is complexed.

As Natta et al. have shown, triethyl aluminum combines with $TiCl_3$ and other low valency crystalline transition metal compounds to form catalysts capable of polymerizing the unsaturated hydrocarbons stereospecifically to crude polymerizates consisting prevailingly of isotactic macromolecules. However, when triethyl aluminum is complexed e.g. with diethyl ether, it becomes a highly effective protective agent for the alkyl beryllium compound combined with the transition metal halide to form the catalyst.

Etherates of organometallic aluminum compounds, of the general formula $R_2AlX.R'.O.R''$ in which R is an alkyl radical containing from 2 to 16 carbon atoms, an aryl or a cycloalkyl radical, R' and R'' are alkyl radicals containing from 1 to 10 carbon atoms, aryl-, alkylaryl- or cycloalkyl radicals and X has the same significance of R or is chlorine, can be used successfully.

Illustratively, when the catalyst consists of diethyl beryllium, triethyl aluminum diethyl etherate and titanium trichloride in molar ratios in the range 0.05:0.25:1.0 to 0.05:5.0:1.0, it is highly effective for the stereospecific polymerization of the unsaturated hydrocarbons directly to the crude polymerizate consisting prevailingly of isotactic macromolecules, and is resistant to oxygen-containing impurities.

The alkyl aluminum etherates do not effect either the stereospecificity or the activity of the catalyst.

The catalytic systems containing the alkyl aluminum etherates as protective agent are as stereospecific and as active as the catalysts prepared from the transition metal halide and larger amounts of the alkyl beryllium compound.

In addition to triethyl aluminum etherate, the following other specific alkyl aluminum etherates may be used as protective agent for the present purpose:

$Al(C_2H_5)_3.O(i-C_3H_7)_2$; $Al(C_2H_5)_3.O(n-C_4H_9)_2$;
$Al(C_2H_5)_3.O(i-C_4H_9)_2$; $Al(i-C_4H_9)_3.O(C_6H_5)_2$;
$Al(C_3H_7)_3.O(CH_3)C_6H_5$; $Al(C_6H_5)_3.O(C_2H_5)_2$;
$Al(C_6H_5)_3.O(i-C_3H_7)_2$; $Al(n-C_6H_{11})_3.O(n-C_3H_7)_2$;
$Al(cyclohexyl-)_3.O(C_2H_5)_2$; $Al(C_2H_5)_3.O(CH_2C_6H_5)_2$;
$Al(i-C_4H_9)Cl_2.O(C_2H_5)_2$; $Al(C_2H_5)_2Cl.O(CH_3)_2$;
$Al(C_2H_5)_2(OC_2H_5).O(i-C_3H_7)_2$;
$Al(i-C_4H_9)_2O(i-C_4H_9).O(C_2H_5)_2$ Other electron donors can be complexed with the organometallic aluminum compounds to form useful protective agents. These include: pyridine, quinoline, picolines, quinaldine, lepidine, triphenylamine, p-dioxane, tetrahydrofuran, dimethyl glycol ether, diphenylsulfide, thioanisole, phosphorus trichloride, phosphorus tribromide, alkyl- or aryl phosphines.

The present improved polymerization process utilizing the stereospecific polymerization catalysts modified by the inclusion of the protective agent has the important practical advantage that high yields of the crude polymerizates consisting prevailingly of isotactic macromolecules are obtained while the cost of the catalyst required to produce the high yields is considerably less than when stereospecific catalysts prepared from the alkyl beryllium compounds are used in the absence of the protective agent.

Using the catalyst prepared from diethyl beryllium and titanium trichloride but modified by the addition of triethyl aluminum diethyl etherate in the molar ratios mentioned above, a yield of 2,500–3,500 grams of polypropylene per gram of diethyl beryllium is obtained readily. This is in contrast to the yield of only 800–1,000 grams of polymer per gram of diethyl beryllium that can be obtained with the catalyst prepared from diethyl beryllium and titanium trichloride even when the two components are carefully purified.

The polymers obtained by polymerizing the unsaturated hydrocarbon, such as propylene, in contact with the present catalysts have a very high molecular weight and, consequently, a high viscosity in the molten state. The viscosity is usually above 1.5 and too high for ready extrusion of the molten mass.

Polymers of lower molecular weight, and more readily melt-extrudable, can be obtained by including gaseous hydrogen in the polymerization system.

The polymerization is carried out in an inert liquid polymerization medium which is preferably a paraffinic hydrocarbon including a light gasoline substantially free of olefinic bonds, n-heptane, iso-octane, and the like. Anhydrous benzene may also be used. The hydrocarbon solvent may be the monomer to be polymerized.

The alkyl beryllium compound used in preparing the modified catalysts is a dialkyl beryllium or alkyl beryllium chloride in which the alkyl radicals contain from 2 to 4 carbon atoms.

The transition metal compound is a solid crystalline chloride of titanium, vanadium or zirconium in which the metal has a low valency, and which is insoluble in the hydrocarbon solvent used as the inert polymerization medium.

The catalyst can be prepared by suspending the solid transition metal halide, such as powdery violet $TiCl_3$, in a solution of the alkyl beryllium compound in a hydrocarbon solvent inert to the catalyst, and subsequently heating the suspension, for instance to a temperature of 50° C. to 90° C.

Instead of violet crystalline titanium trichloride, other low valency, solid crystalline compounds of the transition metals may be used. For instance, solid crystalline titanium dichloride is equally effective for preparing the present modified catalysts. Other useful specific solid crystalline transition metal compounds are vanadium trichloride and zirconium trichloride.

The molar ratio of the alkyl beryllium compound, organometallic aluminum etherate or complex of the organometallic aluminum compound with another electron donor and hydrocarbon-insoluble solid crystalline transition metal chloride is in the range 0.05:0.25:1.0 to 0.05:5.0:1.0.

The following examples illustrate specific embodiments of the invention, it being understood that these examples are not intended to be limiting.

*Example I*

1.8 g. titanium trichloride, suspended in a heptane solution containing 0.9 g. triethyl aluminum diethyl etherate and 0.07 g. diethyl beryllium having a purity of 85%, in 200 cc. anhydrous n-heptane, are introduced into a previously evacuated 1080 cc. stainless steel shaking autoclave kept at 75° C.

Immediately thereafter, the agitation of the autoclave is started and, after 5 minutes, from a tank containing gaseous propylene, the monomer is introduced up to a pressure of 3.4 atm. Pressure, temperature and agitation of the autoclave are then kept constant for 28 hours. The polymerization rate is measured at regular intervals by the decrease of pressure in the monomer feeding tank.

At the end of this time, 100 cc. methanol are introduced into the autoclave and the crude polymerization product, which is a very fine violet powder, is discharged. The purification of the polymer is effected by repeated treatment with methanol and hydrochloric acid and final washing with methanol alone. After drying, the crude polymerizate amounts to 153 g.

The polymer yield is 2,550 g. per gram of Be(C$_2$H$_5$)$_2$.

The crude polypropylene is fractionated by extraction with boiling solvents in a Kumagawa extractor, employing acetone, ether and n-heptane in that order. The acetone extract corresponds to 1.3% of the total polymerizate. The ether extract (4.2% of the polymerizate obtained) consists of a linear, head-to-tail, atactic polypropylene having an intrinsic viscosity of 0.67, in tetrahydronaphthalene solution at 135° C. The heptane extract (4.3% of the total polymer) consists of a polypropylene which is partially crystalline at the X-rays and has an intrinsic viscosity of 1.02.

The residue after heptane extraction comprising the isotactic macromolecules corresponds to 90.2% of the total polymerizate, is highly crystalline at the X-rays, and has an intrinsic viscosity of 2.6.

In other runs in which the stereospecific polymerization was carried out at 75° C. under a pressure of 3.4 atm., using 200 cc. of n-heptane as the inert polymerization medium and a catalyst prepared from 0.0116 mol violet crystalline titanium trichloride, 0.0009 mol of diethyl beryllium, and 0.0042 triethyl aluminum diethyl etherate, there were obtained, for polymerization times of 28, 20 and 114 hours, respectively, crude polypropylenes which were 90.2%, 96.0% and 94.0% non-extractable with boiling n-heptane. The residues of the boiling n-heptane extraction had an intrinsic viscosity in tetrahydronaphthalene at 135° C. of, respectively, 2.60, 2.55 and 2.90.

Example II

Into an apparatus as in Example I, kept at 80° C., a suspension of 1 g. TiCl$_3$ in 350 cc. of a heptane solution of 0.126 g. Be(C$_2$H$_5$)$_2$, and 0.8 g. triethyl aluminum diethyl etherate, are introduced. Shaking is started, and after a few minutes, hydrogen is introduced up to a pressure of 1.5 atm. and then propylene up to a total pressure of 7 atm., which is kept constant throughout the process by a continuous addition of propylene. After 12 hours, the reaction product is discharged and, proceeding as described in Example I, 52 g. of a powdery white polymer having an intrinsic viscosity of 0.91, are isolated.

Example III 1 g. titanium trichloride and a solution of 0.136 g. beryllium ethyl monochloride and 10.8 g. triethyl aluminum diethyl etherate in 250 cc. n-heptane are introduced into a shaking autoclave of approximately 1 liter capacity. After heating to 80° C., propylene is added up to 7 atm. pressure (gauge).

Pressure and temperature are kept constant for about 4 hours.

The reaction product is then taken out and, after purification, 110 g. powdery polypropylene are isolated, 96% of which is insoluble in boiling n-heptane.

The amount of catalyst used in carrying out the polymerization is sufficient to promote the reaction so that it proceeds at a commercially feasible rate, and can be determined readily.

The polymerization is carried out in the substantial absence of air and water, and preferably under an atmosphere of an inert gas such as nitrogen.

Other alkyl beryllium compounds, alkyl aluminum etherates, and solid low valency, crystalline and hydrocarbon-insoluble transition metal chlorides as disclosed herein may be used in the molar ratios disclosed, in preparing the modified catalysts, with results similar to those reported in the foregoing illustrative examples.

Example IV 150 g. of 1-butene are polymerized operating as in Example I. After 18 hours, the reaction product is discharged and, proceeding as described in Example I, 106 g. polybutene, which is highly crystalline at the X-rays and leaves 91% residue when extracted with boiling ethyl ether.

Example V

The process of Example IV is repeated, using, however, 12.4 g. of triethyl aluminum di-isopropyl etherate, instead of the diethyl etherate. 108 g. polybutene are obtained, 90.4% of which is insoluble in boiling diethyl ether.

Example VI

The process of Example I is repeated, using 1.6 g. of a 1:1 triethyl aluminum-anisole complex, instead of the diethyl etherate.

160 g. polypropylene are obtained, 91.5% of which remains as a residue after extraction with boiling n-heptane, and which has an intrinsic viscosity (in tetrahydronaphthalene at 135° C.) of 2.9.

Example VII

The process of Example I is repeated, using 2.5 g. of 1:1 triethyl aluminum-diphenyl ether, instead of the diethyl etherate. 175 g. polypropylene are obtained, having an intrinsic viscosity of 2.8 and which leave a residue of 92.0% when extracted with boiling n-heptane.

The polymerization can be carried out at temperatures between 20° C. and 120° C. and under atmospheric pressure or a low pressure up to 30 atmospheres above normal atmospheric pressure.

The precipitation and fractionation of the crude polymerizate described in the illustrative examples given were carried out mostly for analyzing the polymerizate and establishing the content of isotactic macromolecules in the crude. Because of the high content of isotactic macromolecules therein, the crude polymerizate is useful directly as obtained for all of the purposes for which isotactic polymers are suitable. In practice, it is sufficient to simply wash the crude polymerizate, which separates spontaneously from the solvent, with alcohols to remove the occluded catalyst, and to dry the same.

Various changes and modifications may be made in details in practicing the invention without departing from the spirit thereof. It is to be understood, therefore, that we intend to include in the scope of the appended claims all such modifications and changes as may be apparent to those skilled in the art from the disclosures made herein.

We claim:

1. A process for polymerizing an alpha-olefin selected from the groups consisting of propylene and butene-1 which process comprises contacting the alpha-olefin, under polymerization conditions, with a catalyst prepared from (1) an alkyl beryllium compound selected from the group consisting of beryllium dialkyls and alkyl beryllium halides in which the alkyl group contains from 2 to 4 carbon atoms, (2) a complex of an organoaluminum compound selected from the group consisting of aluminum trialkyls and dialkyl aluminum monohalides with an electron donor selected from the group consisting of ether and organic bases, in which complex the organoaluminum compound is one that, in the presence of a transition metal chloride as defined under (3), would normally act as a polymerization catalyst for the alpha-olefin, but which is prevented from so acting by the electron donor with which is is complexed, and (3) a solid, crystalline, low valency, hydrocarbon-insoluble chloride of a transition metal selected from the group consisting of titanium, vanadium, zirconium and chromium, the molar ratio of (1):(2):(3) in the catalyst being in the range 0.05:0.25: 1.0 to 0.05:5.0:1.0, and recovering from the polymerization mass a crude polymerizate containing a high proportion of isotactic macromolecules.

2. The process according to claim 1, in which the complex of an organoaluminum compound with an electron donor is an etherate of the general formula R$_2$AlX.R'OR" in which R is selected from the group consisting of alkyl radicals containing from 2 to 16 carbon atoms, aryl- and cycloalkyl radicals, R' and R" are selected from the group consisting of alkyl radicals containing from 1 to 10 carbon atoms, aryl-, alkyl-aryl- and cycloalkyl radicals, and X is selected from the group comprising R and chlorine.

3. The process according to claim 1, characterized in that the catalyst is prepared from (1) diethyl beryllium, (2) triethyl aluminum diethyl etherate, and (3) titanium trichloride.

4. A process for polymerizing propylene to a crude polypropylene containing a high proportion of isotactic macromolecules, which process comprises contacting propylene, under polymerization conditions, with a catalyst prepared from diethyl beryllium and titanium trichloride, and containing added triethyl aluminum diethyl etherate, the molar ratio of the diethyl beryllium, triethyl aluminum etherate and titanium trichloride in the catalyst being in the range of 0.05:0.25:1.0 to 0.05:5.0:1.0.

5. A process for polymerizing propylene to a crude polypropylene containing a high proportion of isotactic macromolecules, which process comprises contacting propylene, under polymerization conditions, with a catalyst prepared from ethyl beryllium monochloride and titanium trichloride, and containing added triethyl aluminum diethyl etherate, the molar ratio of the ethyl beryllium monochloride, triethyl aluminum ether and titanium trichloride in the catalyst being in the range of 0.05:0.25:1.0 to 0.05:5.0:1.0.

6. A process for polymerizing butene-1 to a crude polybutene-1 containing a high proportion of isotactic macromolecules, which process comprises contacting butene-1, under polymerization conditions, with catalyst prepared from diethyl beryllium and titanium trichloride, and containing added triethyl aluminum diethyl etherate, the molar ratio of the diethyl beryllium, triethyl aluminum diethyl etherate and titanium trichloride in the catalyst being in the range of 0.05:0.25:1.0 to 0.05:5.0:1.0.

References Cited by the Examiner

FOREIGN PATENTS 569,443 1/1959 Belgium.
1,139,806 2/1957 France.

JOSEPH L. SCHOFER, *Primary Examiner.*

F. L. DENSON, *Assistant Examiner.*